United States Patent [19]

Yamada

[11] Patent Number: 4,810,901
[45] Date of Patent: Mar. 7, 1989

[54] SOLID-STATE LINE-ADDRESSED CHARGE TRANSFER DEVICE IMAGE SENSOR READOUT

[75] Inventor: Tetsuo Yamada, Yokohama, Japan

[73] Assignee: Kabushiki Kaisha Toshiba, Kawasaki, Japan

[21] Appl. No.: 30,988

[22] Filed: Mar. 27, 1987

[30] Foreign Application Priority Data

Mar. 31, 1986 [JP] Japan .................. 61-73454

[51] Int. Cl.$^4$ .................. H03K 3/42; H01L 29/78; H01L 27/14; H04N 3/14
[52] U.S. Cl. .................. 307/311; 357/24; 357/30; 358/213.24; 358/213.26
[58] Field of Search .............. 357/24, 30; 307/311; 358/213.24, 213.26

[56] References Cited

U.S. PATENT DOCUMENTS 4,242,700  12/1980  Weimer .................. 357/24 LR
4,607,286  8/1986  Weimer .................. 357/24 LR

OTHER PUBLICATIONS

IEEE International Solid-State Circuits Conference: Digest of Technical Papers, pp. 100–101; M. Kimata et al., 1985.

Primary Examiner—Gene M. Munson
Attorney, Agent, or Firm—Foley & Lardner, Schwartz, Jeffery, Schwaab, Mack, Blumenthal & Evans

[57] ABSTRACT

This device has an arrangement to transfer charges produced in photoelectric cells arranged on a two-dimensional matrix using vertical transfer sections and a horizontal transfer section. One charge read operation is executed from photoelectric cells belonging to one group to the vertical transfer sections. Charges from photoelectric cells belonging to two groups are read out at the same time every predetermined charge read operations. Such an operation permits readout and vertical transfer only within the blanking period.

6 Claims, 8 Drawing Sheets

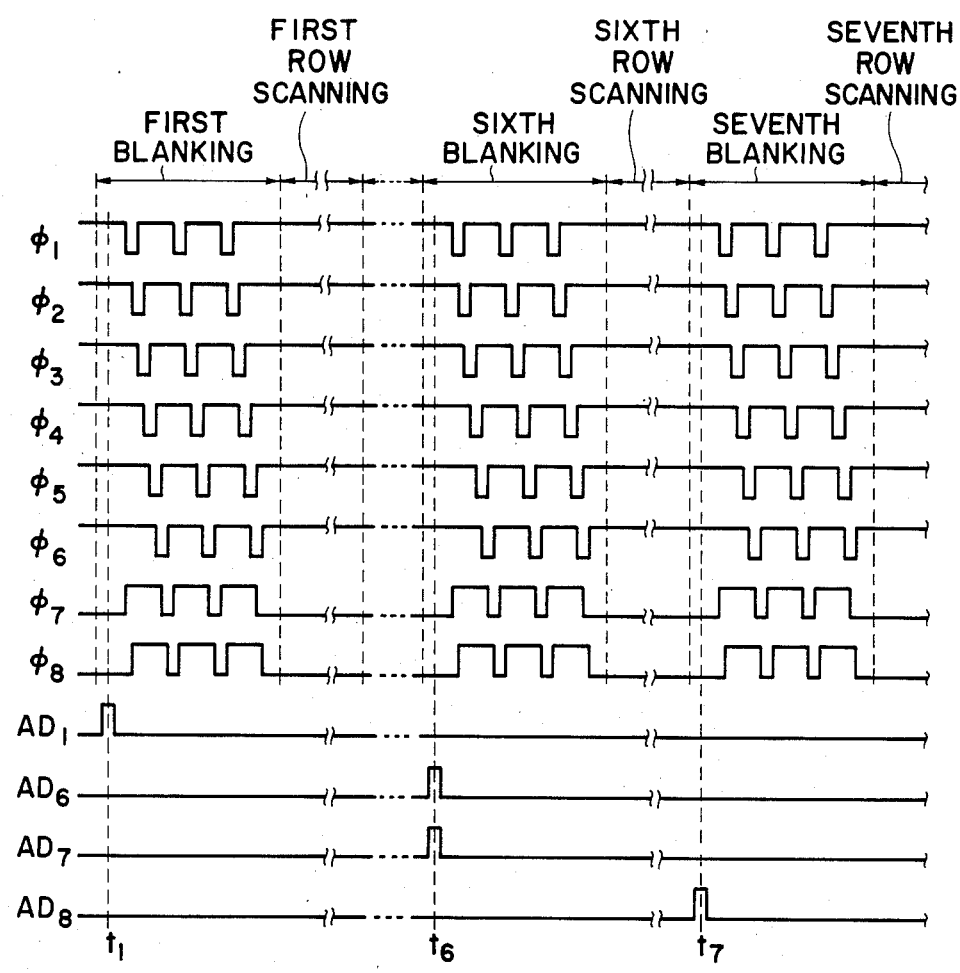
F I G. 7

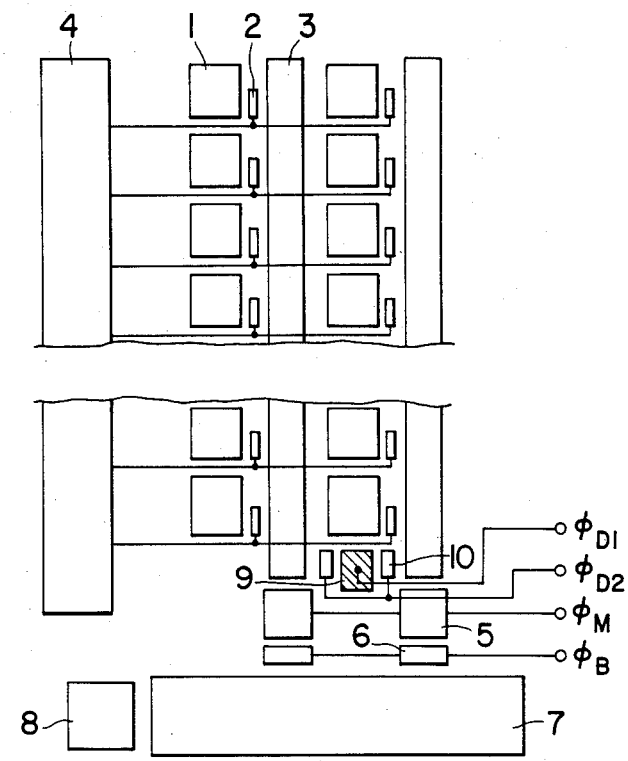
F I G. 9

SOLID-STATE LINE-ADDRESSED CHARGE TRANSFER DEVICE IMAGE SENSOR READOUT

BACKGROUND OF THE INVENTION

The present invention relates to a solid state image sensor, and more particularly to a solid state image sensor of the line addressing type.

A typical solid state image sensor of the line addressing type, in which a device according to the present invention is included, is shown in FIG. 1. Photoelectric cells 1 are arranged in a two-dimensional matrix manner (four rows, two columns, in this example). Charges produced in respective cells 1 are read out to a vertical transfer section 3 through address gates 2. This read operation is carried out using addressing pulses delivered from an address scan circuit 4. Such a read operation is conducted in connection with only an addressed row. A charge which has been read to the vertical transfer section 3 is transferred to the lower direction in this figure by an n-phase transfer clock (two-phase clock comprising $\phi_1$ and $\phi_2$ in the example shown in FIG. 1). The charge is transferred to bottom electrodes 6 through temporary storage electrodes 5, and is further transferred to a horizontal transfer section 7. The charge on the horizontal transfer section 7 is transferred to the left in the figure and then is taken out from an output circuit 8.

FIGS. 2(a) to 2(d) are explanatory views showing the sequence of the conventional transfer operation of the solid state image sensor configured as stated above. FIGS. 3(a) to 3(d) are time charts for this transfer operation. First, when the first addressing operation is executed at time $t_1$ as shown in FIG. 3(b), a charge S1 is read out to the vertical transfer section 3 as shown in FIG. 2(a). Subsequently, the charge S1 is stored in the temporary storage electrode 5 for a predetermined time interval by clocks $\phi_1$ and $\phi_2$ shown in FIGS. 3(c) and 3(d). Then, the charge S1 thus stored is transferred to the horizontal transfer section 7 via the bottom electrode 6. In a manner similar to the above, the second, third and fourth addressing operations are executed at times $t_2$, $t_3$ and $t_4$, respectively. Thus, charges S2, S3 and S4 are read out as shown in FIGS. 2(b), 2(c) and 2(d), respectively. In this example, respective addressing cycles $T_{a1}$ to $T_{a3}$ are the same. On the other hand, the transfer operation in the horizontal transfer section 7 is carried out in accordance with the row scanning cycle shown in FIG. 3(a). Namely, the charge S1 is transferred on the horizontal transfer section 7 for the first row scanning period beginning from time $t_5$ and is then taken out from the output circuit 8. Similarly, the charges S2, S3 and S4 are transferred for the second, third and fourth row scanning periods beginning from times $t_6$, $t_7$ and $t_8$, respectively. The respective row scanning cycles $T_{s1}$ to $T_{s4}$ are the same and blanking periods are provided in the respective row scanning cycles. It is to be noted that the addressing cycle $T_a$ must be smaller than the row scanning cycle $T_s$. This is because times required for transferring the charges S1 and S4 to the position of the bottom electrode 6 on the vertical transfer section 3 are different from each other. For instance, the charge S4 must be reached to the horizontal transfer section 7 until time $t_8$. Accordingly, it is required that the transfer of the charge S4 is carried out for a time period from time $t_4$ of the fourth addressing time to time $t_8$ by taking a time margin corresponding thereto into account.

However, the drawback with the device which performs the above-mentioned transfer operation is that noise components are superimposed on a signal taken out from the output circuit 8. Such noise components are produced in the addressing operation for reading charges to the vertical transfer section 3 and the operation for transferring charges on the vertical transfer section 3 due to the fact that a pulse voltage applied to each electrode is mixed into an output signal by capacitive coupling. Since such addressing and transfer operations are continuously carried out within a row scanning period as seen from the time chart in FIG. 3, noise mixing cannot be avoided with the conventional device, with the result that only an image having low S/N ratio can be obtained.

To solve such a problem, an attempt is made to complete the above-mentioned addressing and the transfer operations within the blanking period. However, this blanking period is extremely small as compared to the row scanning time as shown in FIG. 3(a). For example, for transferring the charge S4, which is located farmost position, to the horizontal transfer section 7 within this blanking period, a considerable fast transfer speed is required. Particularly, in a large scale device provided with the vertical transfer section having a number of transfer stages, the load capacity of the electrode terminal is in the order of several hundred to several thousand pF. Thus, an extremely large power energy is required for carrying out high speed transfer, resulting in loss of practicability.

On the other hand, a technique to cause the addressing cycle and the row scanning cycle to be in correspondence with each other to solve the above-mentioned problem is disclosed by the inventor of the present invention in the Japanese Patent Publication bearing application No. 206679/1981. The detail of this technique should be referred to the above-mentioned publication and therefore its explanation is omitted here. The drawback with this technique, however, is that all the transfer stages are filled with signal charges according as addressing operations are repeated, thus making it difficult to drain unnecessary charges produced during the vertical transfer operation, resulting in lowered S/N ratio.

SUMMARY OF THE INVENTION

Therefore, an object of the present invention is to provide a solid state image sensor having reduced power dissipation and capable of obtaining an image having good S/N ratio.

To achieve this object, the present invention provides a solid state image sensor comprising a plurality of photoelectric cells arranged on a two-dimensional matrix, a plurality of vertical transfer sections for transferring charges produced in the respective photoelectric cells in a vertical direction, and a horizontal transfer section for transferring, in a horizontal direction, charges transferred from said respective vertical transfer section, characterized in that: the vertical transfer section comprises a plurality of electrodes such that one transfer stage is constituted with successive n electrodes and a drive section for driving these electrodes by n-phase transfer clock; a set of photoelectric cell rows located in an area corresponding to the one transfer stage is divided into p groups thereof, thus to read out charges in photoelectric cells of at least one row belonging to a predetermined group among the p groups into one transfer stage of the vertical transfer section, and to effect transfer operation corresponding to m stages ($m \geq 1$), thereafter to read charges in photoelectric cells of at least one row belonging to the subsequent groups; and at the ($m \times p - 1$)-th read operation, charges in photoelectric cells per at least one row belonging to the subsequent two groups are read out into one transfer stage of the vertical transfer section, thus reducing power dissipation and providing an image having good S/N ratio.

The above-described configuration permits provision of an empty or vacant transfer stage or stages having no signal charge among respective transfer stages of the vertical transfer section, thus making it easy to drain unnecessary charges, with the result that S/N ratio can be improved. In addition, a scheme is employed to apply addressing to two groups per transfer operation corresponding to $m \times p$ stages at the same time to read charges therefrom, thereby eliminating the necessity to cause the transfer speed to be extremely high even when addressing and vertical transfer operations are carried out solely within the blanking period, thus making it possible to suppress the power dissipation to be low.

BRIEF DESCRIPTION OF THE DRAWINGS

FIG. 7 shows a transfer clock time chart of the device shown in FIG. 6;

FIG. 9 is a schematic view illustrating an arrangement of a device according to the present invention.

DETAILED DESCRIPTION OF PREFERRED EMBODIMENTS

The present invention will be described in detail in connection with preferred embodiments with reference to attached drawings.

First embodiment

Figure 1:
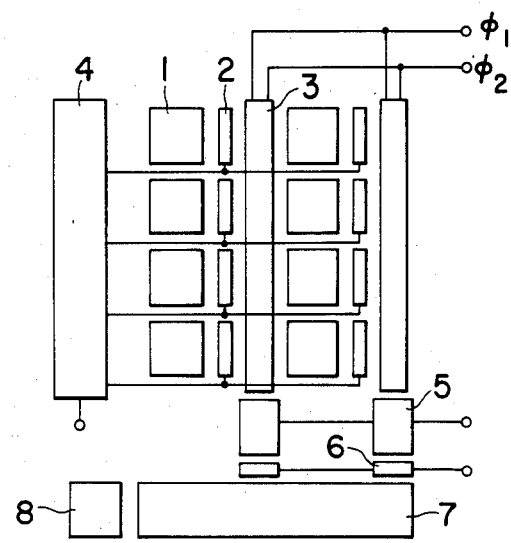
FIG. 1 is schematic view illustrating an arrangement of a device according to the present invention.
Figure 2:
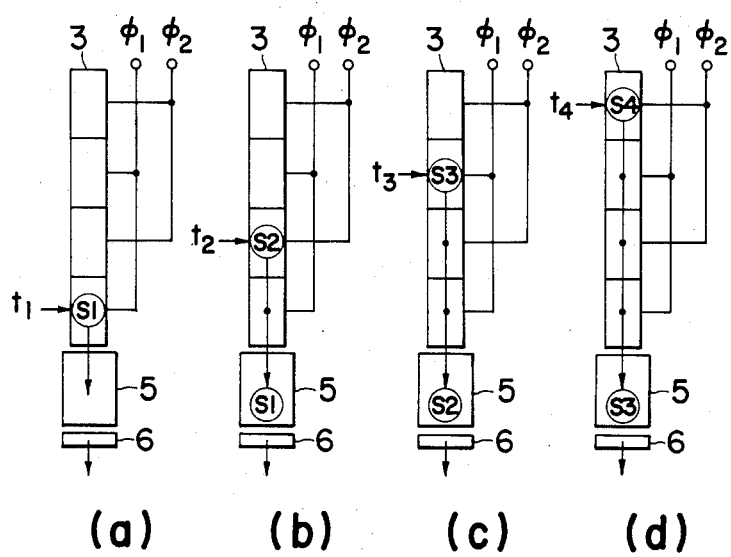
FIGS. 2(a) to (d) are explanatory views showing the transfer operation of a conventional device.
Figure 3:
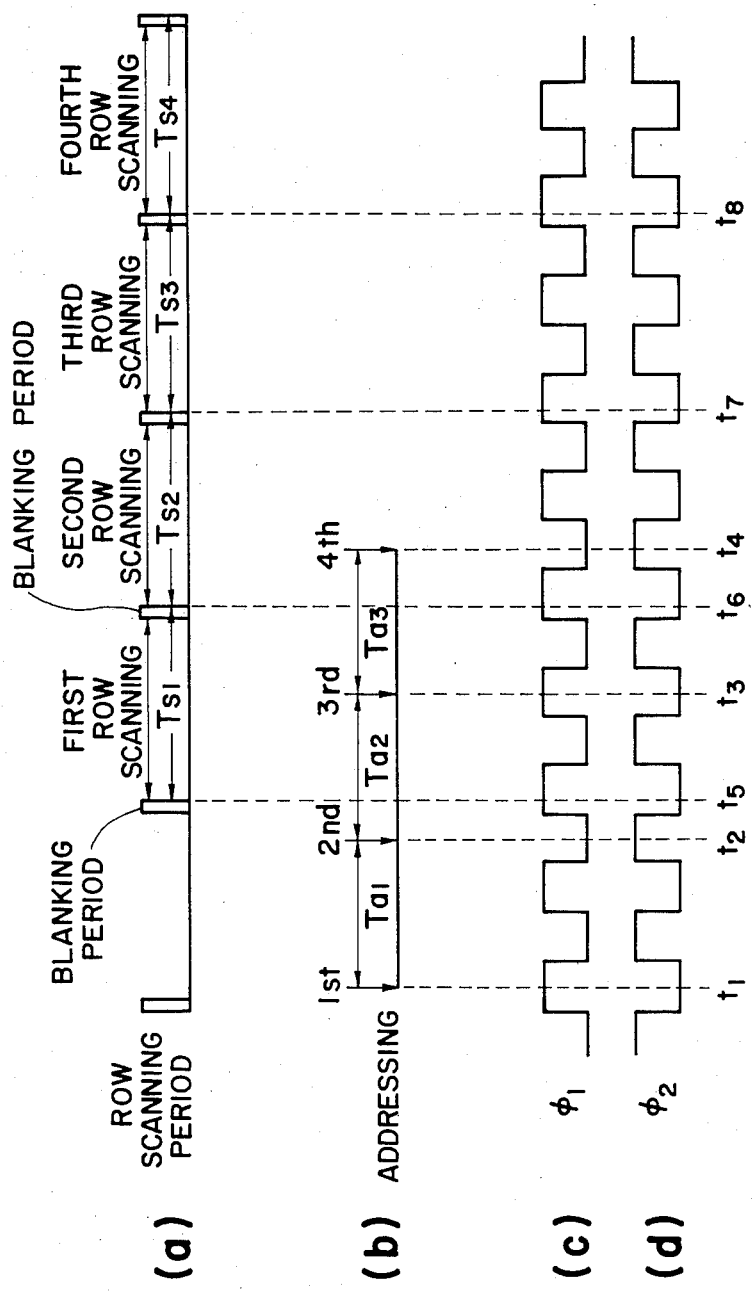
FIGS. 3(a) to (d) are transfer clock time charts of the conventional device shown in FIG. 2.
Figure 4:
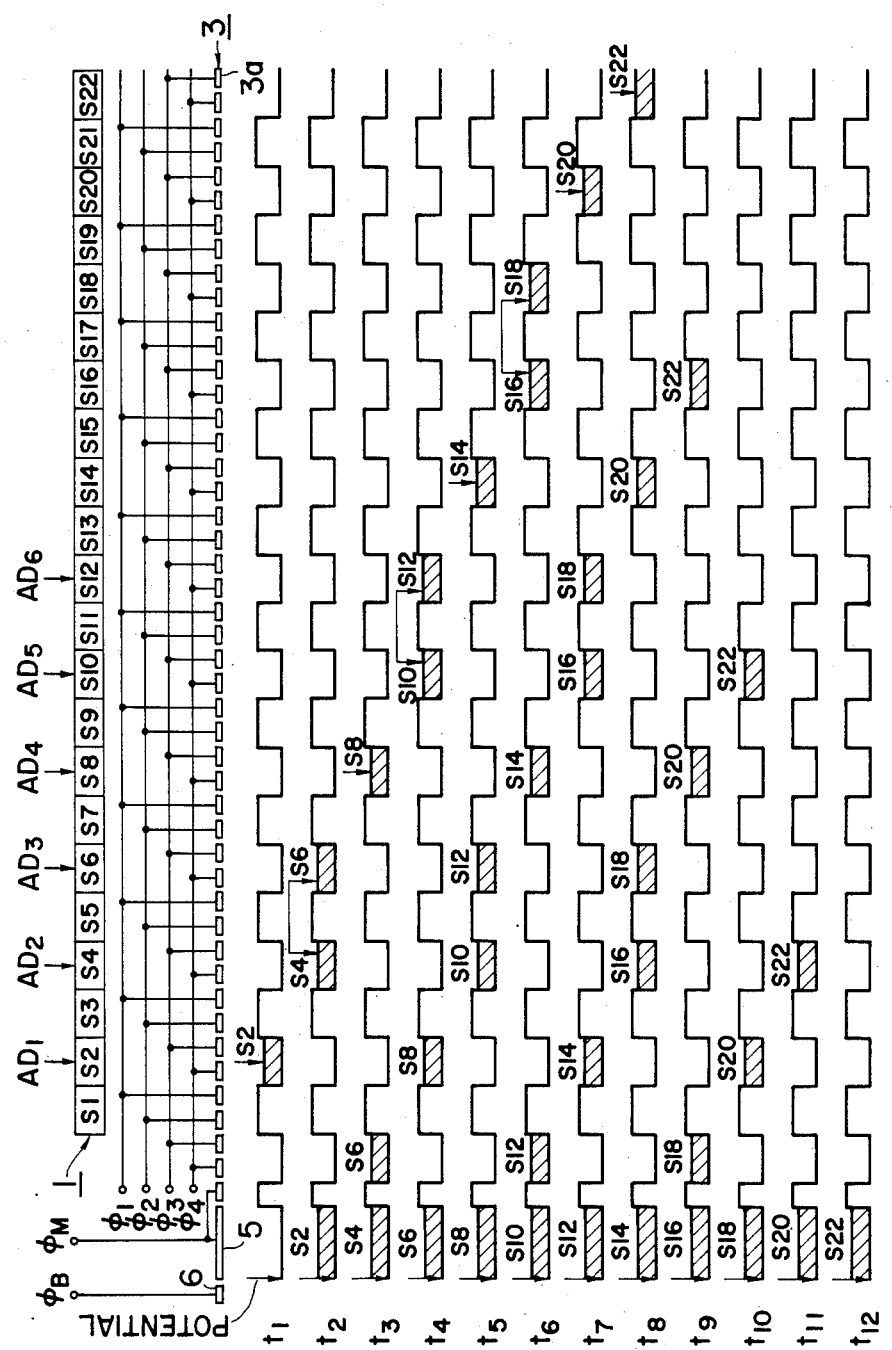
FIG. 4 is an explanatory view showing the transfer operation of a first embodiment of a device according to the present invention.

FIG. 4 is a sequence diagram showing the transfer operation of a vertical transfer section provided in a solid state image sensor according to a first preferred embodiment of the present invention. In this example, reference will be made to the case where respective charges S1 to S22 produced in 22 photoelectric cells 1 are transferred. One transfer stage is composed of four electrodes 3a and is driven by four-phase transfer clocks $\phi_1$ to $\phi_4$. Accordingly, the entire configuration of this device is such that four-phase transfer clocks $\phi_1$ to $\phi_4$ are delivered to the vertical transfer section 3 shown in FIG. 1. To the temporary storage electrode 5 and the bottom electrode 6, clocks $\phi_M$ and $\phi_B$ are delivered, respectively. Read charges from photoelectric cells 1 downwardly to electrodes within the vertical transfer section 3 are carried out by a readout clock $\phi_A$ (not shown in FIG. 4). Namely, address gate pulses $AD_1$ to $AD_6$ are synchronized with the readout clock $\phi_A$. Thus, only a gate to which an address gate pulse signal is applied is opened. As a result, charge read operation is carried out through the opened gate.

A set of photoelectric cells located in an area corresponding to one transfer stage, i.e. in an area corresponding to four electrodes form one group (p=1). For instance, charges S1 and S2 belong to one charge group and charges S3 and S4 belong to another charge group subsequent thereto. In this embodiment, charge read operation of the interlacing system is carried out and charges belonging to odd rows and those belonging to even rows are independently read out. Namely, for read operation of the first field, charges S1, S3, S5, S21 belonging to odd rows are read out. After all of them have been taken out from the output circuit 8, charges S2, S4, S6, ..., S22 belonging to even rows for read operation of the second field are read out and are then taken out from the output circuit 8.

The read operation of the second field will be now described. First, at time $t_1$ within the first blanking period, an address gate is turned on by the pulse $AD_1$. Thus, the charge S2 in the photoelectric cell of the second row is read into a potential well below an electrode in the vertical transfer section 3 as indicated by the potential diagram $t_1$ in FIG. 4. Subsequently, within the first blanking period, four-phase clocks $\phi_1$ to $\phi_4$ are applied by three pulses. Thus, pulses corresponding to solely three transfer stages are transferred. In this instance, at times $t_{1M}$ and $t_{1B}$, clocks $\phi_M$ and $\phi_B$ are applied to the temporary storage electrode 5 and the bottom electrode 6, respectively. When the first blanking period is terminated, the preparation for transferring this charge S2 by the horizontal transfer section 7 is completed. Accordingly, this charge S2 is transferred by the horizontal transfer section 7 within the next first row scanning period and is then taken out from the output circuit 8.

Then, at time $t_2$ within the second blanking period, the charge S4 and the charge S6 of the group subsequent thereto are read out at the same time (the potential diagram $t_2$ in FIG. 4). While read timings by the pulses $AD_2$ and $AD_3$ are completely the same in this embodiment, read operation may be carried out with a time difference to some extent. The key requirement is that charges S4 and S6 can be read out within the same read period. Subsequently, four-phase clocks $\phi_1$ to $\phi_4$ are applied by three pulses within the second blanking period and are then transferred by three transfer stages. Since the clocks $\phi_M$ and $\phi_B$ are applied also at this time, the preparation for transferring the charge S4 in the horizontal transfer section 7 is after all completed at the time of completion of the second blanking period. Thus, the charge S4 is transferred within the subsequent second row scanning period and stays in the final stage of the electrode. Such a condition can be clearly understood from the potential diagram $t_3$ in FIG. 4.

At time $t_3$ within the third blanking period, the charge S8 is read out by the pulse $AD_4$ as indicated by the potential diagram $t_3$ in FIG. 4, and then is transferred by three transfer stages within the third blanking period. At this time, the charge which has stayed in the final stage of the electrode is transferred to the temporary storage electrode 5 and is temporarily held therein. When the clock $\phi_B$ is further applied, the held therein. When charge S6 having been temporarily held is transferred to the horizontal transfer section 7. Then, the charge S6 is transferred to the output circuit 8 within the subsequent third row scanning period and is taken out therefrom. On the other hand, the charge S8 stays at a position where it has been transferred by three transfer stages. Such a condition can be clearly understood from the potential diagram $t_4$ in FIG. 4.

At time $t_4$ within the fourth blanking period, the charge S10 and the charge S12 of the group subsequent thereto are read out at the same time (the potential diagram $t_4$ in FIG. 4). Subsequently, transfer corresponding to three transfer stages is carried out. Thus, the preparation for transferring the charge S8 in a horizontal direction is completed as indicated by the potential diagram $t_5$ in FIG. 4 and the charges S10 and S12 stay in the intermediate electrodes. At this time $t_5$, the charge S14 is read out. Such a condition can be readily understood by viewing the potential diagrams $t_6$ to $t_{12}$ in FIG. 4 in due order.

Figure 5:
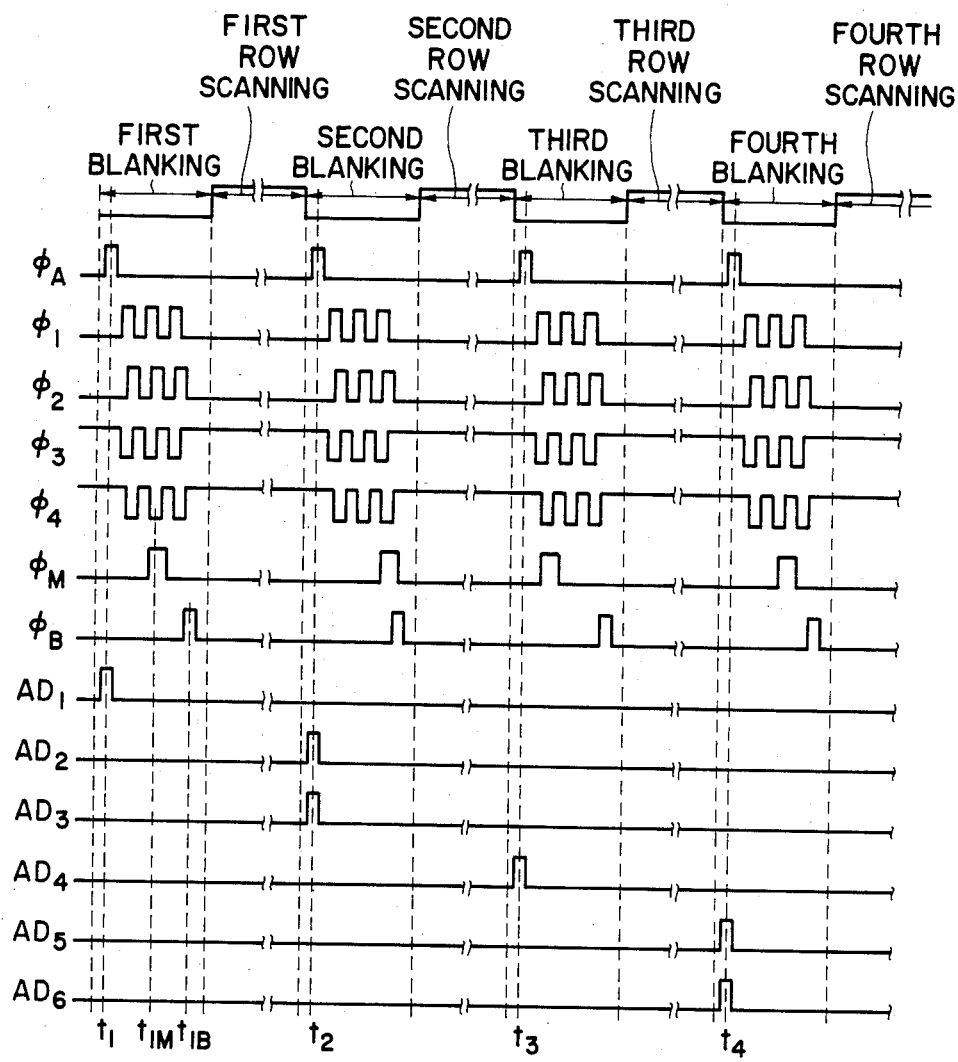
FIG. 5 shows a transfer clock time chart of the device shown in FIG. 4.

The feature of the above-mentioned operation resides in that after the transfer operation corresponding to three stages is carried out, the subsequent read operation is conducted, and in that charges are read out from two groups at the same time one to every two read operations. As a general principle, in the case where a set of photoelectric cell rows located in an area corresponding to one transfer stage are divided into p groups (p=1 in this embodiment) to read charges every time transfer corresponding to m stages (m=3 in this embodiment) is carrried out, it is sufficient to read charges from two groups at the same time every time the (m×p−1)-th read operation is conducted. In accordance with this operation principle, as seen from the time chart in FIG. 5, it is sufficient to effect read operation (addressing) and the vertical transfer operation within the blanking period, thus making it possible to prevent noises due to the clock from being mixed into the output circuit 8. Further, charges are read out from two groups at the same time. Accordingly, this permits transfer to be carried out with a sufficient time margin, eliminates the necessity of increasing the transfer speed, and makes it possible to drive the image sensor with low power dissipation. In addition, as seen from the potential diagram in FIG. 4 in this embodiment, empty wells are provided three by three between potential wells by which signal charges are being transferred, thus making it easy to drain unnecessary charges.

For draining unnecessary charges, as described in FIG. 9, it is sufficient to provide a drain 9 for draining unnecessary charges and a drain electrode 10 in the vicinity of the final transfer stage of the vertical transfer section 3 to apply predetermined signals $\phi_{D1}$ and $\phi_{D2}$ to the drain electrode 10 to drain charges accumulated in the empty well to the drain 9 for draining unnecessary charges. Generally, there occurs a phenomenon in the solid state image sensor such that a portion of light incident to the photoelectric cell is directly intruded into the vertical transfer section 3 (CCD is usually used), or a charge produced in the photoelectric cell leaks, resulting in occurrence of unnecessary charges called "smear". If such an unnecessary charge is mixed from the output circuit 8 into the signal charge and is taken out therefrom, there is the possibility that blooming of an image occurs. It has been known that such unnecessary charges are distributed on the average over the whole transfer stage by the transfer operation. Accordingly, if a necessary number of empty wells are provided, unnecessary charges mixed into the wells during the transfer of signal charges will be reduced accordingly. In addition, the unnecessary charges accumulated in the empty well can be easily drained by controlling $\phi_{D1}$ and $\phi_{D2}$. Thus, a quantity mixed into the signal charge is reduced to substantially one third.

Second embodiment

Figure 6:
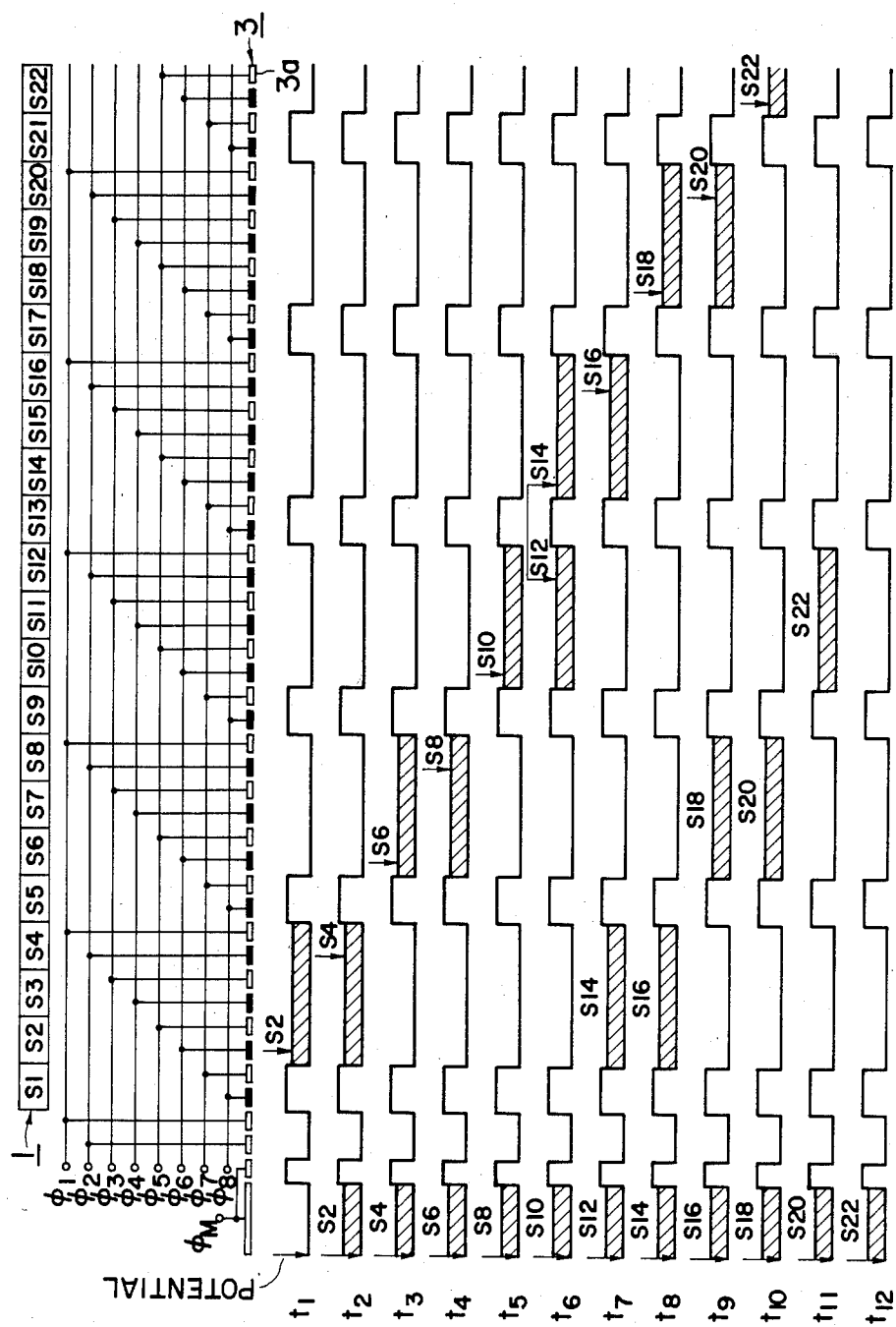
FIG. 6 is an explanatory view showing the operation of a second embodiment of a device according to the present invention.

FIG. 6 is a sequence diagram showing transfer operation of a vertical transfer section provided in a solid state image sensor according to a second preferred embodiment of the present invention. FIG. 7 is a timing chart for respective clock pulses used in the device shown in FIG. 6. In this example, one transfer stage is composed of eight electrodes $3a$ and is driven by eight-phase transfer clocks $\phi_1$ to $\phi_8$ (n=8). A set of photoelectric cells located in an area corresponding to one transfer stage, i.e., in an area corresponding to eight electrodes form two groups (p=2). For instance, the charges S1 and S2 belong to the first group and the charges S3 and S4 belong to the second group. The read operation of the second field based on the interlacing system will be now described in the same manner as in the first embodiment. In this example, potential wells are formed as indicated by the potential diagram in FIG. 6, wherein clocks of high level are applied to six electrodes and clocks of low level are applied to two electrodes whereby charges are accumulated and transferred over an area corresponding to six electrodes. Thus, a quantity of charges transferred is three times larger than that in the first embodiment.

First, at time $t_1$, charge S2 is read out and transferred by three transfer stages within the first blanking period. Thus, the preparation for transferring charges in a horizontal direction is completed. Subsequently, at times $t_2$, $t_3$, $t_4$ and $t_5$, charges S4, S6, S8 and S10 are read out by three transfer stages, respectively.

Then, at time $t_6$, charges S12 and S14 of a group subsequent thereto are read out at the same time (the potential diagram $t_6$ in FIG. 6). They are transferred by three transfer stages within the sixth blanking period. At time $t_7$, the next charge S16 is read out. In a manner similar to the above, read and transfer operations are carried out. Such a condition is shown in the potential diagrams $t_8$ to $t_{12}$ in FIG. 6.

The feature of the above-mentioned operation resides in that after transfer operation corresponding to three stages is carried out, the subsequent read operation is conducted, and in that a set of photoelectric cell rows located in an area corresponding to one transfer stage are divided into two groups (p=2). Thus, it is sufficient to conduct simultaneous read operation from two groups every fifth (m×p−1) read operations in accordance with the above-described operational principle. In addition, since empty wells are present in the same manner in the first embodiment, it is easy to drain unnecessary charges such as smear charges, etc., whereby a quantity mixed into the signal charge is reduced to substantially one third.

Third embodiment

Figure 8:
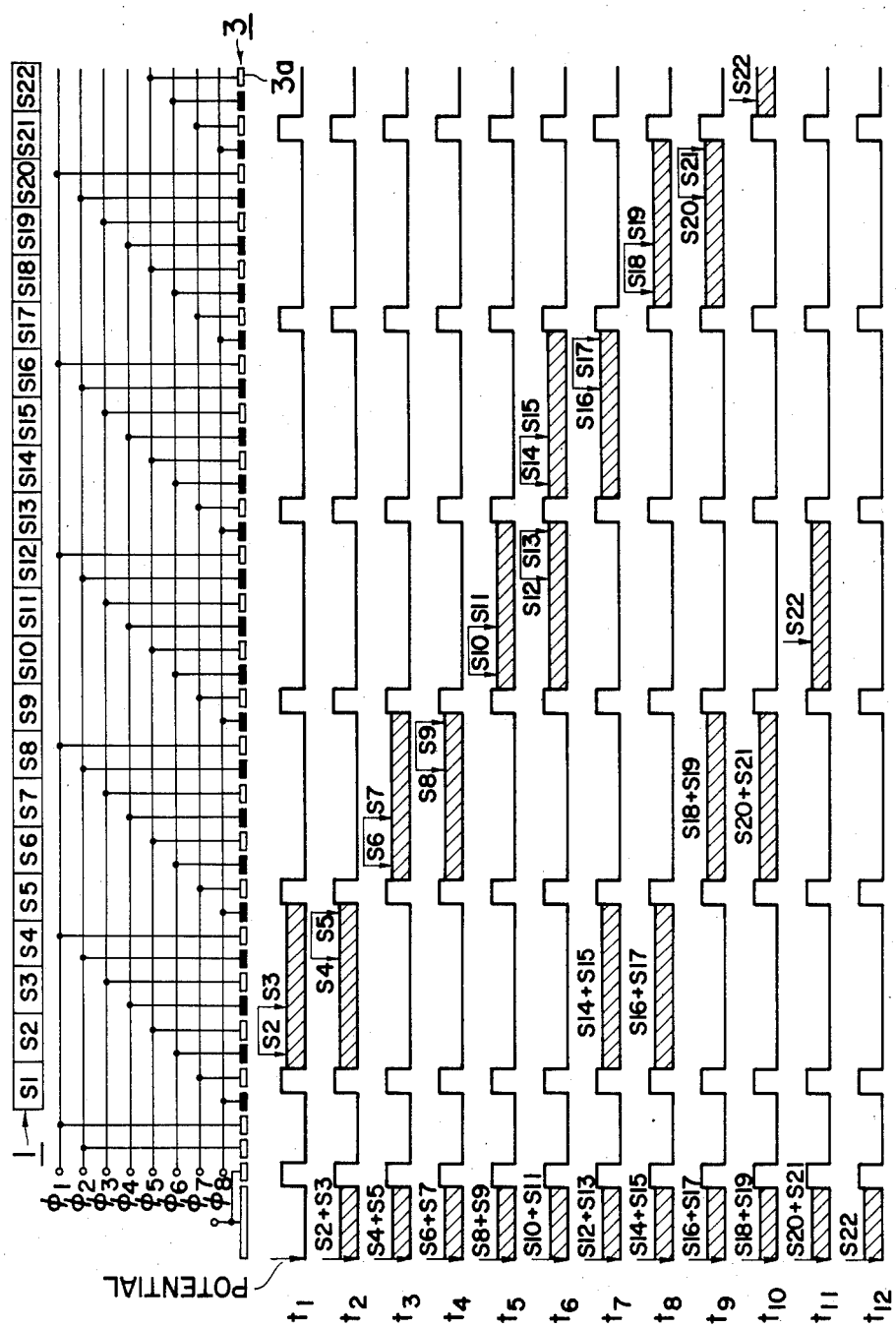
FIG. 8 is an explanatory view showing the transfer operation of a third embodiment of a device according to the present invention.

FIG. 8 is a sequence diagram showing the transfer operation of a vertical transfer section provided in a solid state image sensor according to a third preferred embodiment of the invention. In this example, one transfer stage is composed of eight electrodes $3a$ in the same manner as in the second embodiment and is driven by eight-phase transfer clocks $\phi_1$ to $\phi_8$ (n=8). A set of photoelectric cells located in an area corresponding to one transfer stage, i.e., in an area corresponding to eight electrodes form two groups (p=2). For instance, charges S2 and S3 belong to the first group and charges S4 and S5 belong to the second group. In this embodiment, read operation generally called "field accumulation" is carried out. In the first field, charges S1+S2, S3+S4, ..., S21+S22 are read out as a unit, respectively. In the second field, charges S2+S3, S4+S5, ..., S20+S21, S22 are read out as unit, respectively. The read operation of the second field will be now described. The potential wells to be formed are such that clocks of high level are applied to seven electrodes and a clock of low level is applied to one electrode, whereby charges are accumulated and transferred over an area corresponding to seven electrodes.

First, at time $t_1$, charges S2+S3 are read out and are transferred by three transfer stages within the first blanking period. Thus, the preparation for the horizontal transfer is completed. Subsequently, at times $t_2$, $t_3$, $t_4$ and $t_5$, charges S4+S5, S6+S7, S8+S9 and S10+S11 are read out every three transfer stages.

Then, at time $t_6$, charges S12+S13 and S14+S15 of a group subsequent thereto are read out at the same time (the potential diagram $t_6$ in FIG. 8) and these charges are transferred by three transfer stages within the sixth blanking period. At time $t_7$, the next charge S16+S17 are read out. The transfer will be conducted in order as indicated by the potential diagrams $t_8$ to $t_{12}$ in FIG. 8.

The feature of the above-mentioned operation resides in that after transfer operation corresponding to three stages (m=3) is carried out, the subsequent read operation is conducted, and in that a set of photoelectric cell rows located in an area corresponding to one transfer stage are divided into two groups (p=2). Thus, it is sufficient to effect simultaneous read operation from two groups every time the (m×p−1)=5-th read operation is conducted.

While the present invention has been described in connection with the above-mentioned three embodiments, the present invention is not limited to these embodiments, but is applicable to any arrangement capable of realizing transfer operation based on the above-mentioned operational principle. Though the number m of transfer stages is all equal to 3 in the above-mentioned embodiments, when m is equal to in general, the unnecessary charge such as smear charge can be reduced to 1/l. Moreover, when the number of electrodes constituting one transfer stage is further increased, it is possible to further increase a quantity of charges transferred.

In addition, address gates and transfer electrodes may be electrically connected in common to superimpose an addressing voltage on a transfer voltage.

As apparent from the foregoing description, the solid state image sensor according to the present invention is implemented so that when the vertical transfer section performs a predetermined transfer, two groups are addressed at the same time to conduct charge read operation, thus making it possible to execute the addressing operation and the vertical transfer operation only within the blanking period and to provide empty transfer stages in which no signal charge is included, resulting in realization of reduction of the power dissipation and the improved S/N ratio.

What is claimed is:

1. A solid state image sensor comprising a plurality of photoelectric cells arranged on a two-dimensional matrix, a plurality of vertical transfer sections for transferring charges produced in said respective photoelectric cell, and a horizontal transfer section for transferring, in a horizontal direction, charges transferred from said respective transfer sections, characterized in that said vertical transfer section comprises a plurality of electrodes such that one transfer stage is constituted with successive n electrodes, and a drive section for driving these electrodes by n-phase transfer clock, said solid state image sensor further comprising addressing means having a function such that a group of photoelectric cell rows located in an area corresponding to the one transfer stage is divided into p groups, thus to read out charges in photoelectric cells of at least one row belonging to a predetermined group among said p groups into one transfer stage of said vertical transfer section, and to effect transfer operation corresponding to m stages (m≧1), thereafter to read charges in photoelectric cells of at least one row belonging to a group subsequent to said predetermined group to one transfer stage of said vertical transfer section, and such that at the time of the (m×p−1)-th read operation, charges in photoelectric cells per at least one row belonging to two groups subsequent to said predetermined group are read out into one transfer stage of said vertical transfer section.

2. A solid state image sensor as set forth in claim 1, wherein the read operation for charges belonging to two groups is carried out using the same clock pulse.

3. A solid state image sensor as set forth in claim 1, wherein setting is made such that m is equal to 2 or more, means for draining unnecessary charges in transfer stages by which no charge is read out being provided in the vicinity of the final stage of said vertical transfer section.

4. A solid state image sensor as set forth in claim 1, wherein the operations for reading charges and for transferring them in a vertical direction are performed for a time period except for a time period during which charges per each row are output to the external.

5. A solid state image sensor as set forth in claim 1, wherein photoelectric cell rows belonging to one group are divided into a plurality of fields, whereby after the read and transfer operations for all photoelectric cells belonging to one field have been completed, the read and transfer operations for photoelectric cells belonging to the next field are conducted.

6. A solid state image sensor as set forth in claim 5, wherein one or two successive transfer clocks among n-phase transfer clocks serve to provide a potential such that potential barriers serving as boundaries are caused to be formed between respective transfer stages at the time of charge read operation, and to hold said potential barrier pattern fixed during read and transfer operations for one field.

* * * * *